United States Patent [19]

De Rooy

[11] Patent Number: 5,325,205
[45] Date of Patent: Jun. 28, 1994

[54] VIDEO CAMERA COMPRISING AT LEAST A SEMICONDUCTOR IMAGE SENSOR AND A ROTATING SECTOR SHUTTER

[75] Inventor: Jacobus De Rooy, Sprundel, Netherlands

[73] Assignee: U.S. Philips Corporation, New York, N.Y.

[21] Appl. No.: 957,295

[22] Filed: Oct. 6, 1992

[30] Foreign Application Priority Data

Oct. 7, 1991 [DE] Fed. Rep. of Germany ....... 4133164

[51] Int. Cl.$^5$ .......................................... H04N 5/238
[52] U.S. Cl. .................... 348/368; 354/254; 348/297
[58] Field of Search ................ 358/213.13, 228, 163, 358/213.19; 354/250, 254, 238.1, 245; 352/216, 210, 219, 204; H04N 5/238

[56] References Cited

U.S. PATENT DOCUMENTS

| | | | |
|---|---|---|---|
| 3,512,464 | 5/1970 | Cochran et al. | 354/254 |
| 4,301,476 | 11/1981 | Keller et al. | 358/209 |
| 4,669,841 | 6/1987 | Kaneko et al. | 354/254 |
| 4,827,348 | 5/1989 | Ernest et al. | 358/228 |
| 4,849,819 | 7/1989 | Ishiguro et al. | 358/213.13 |
| 4,985,775 | 1/1991 | Murayama et al. | 358/213.13 |
| 5,049,996 | 9/1991 | Kaneko et al. | 358/213.13 |

FOREIGN PATENT DOCUMENTS

| | | | |
|---|---|---|---|
| 0377914 | 11/1989 | European Pat. Off. | |
| 61-071776 | 4/1986 | Japan | H04N 5/238 |
| 1177779 | 7/1989 | Japan | H04N 5/238 |

*Primary Examiner*—Michael T. Razavi
*Assistant Examiner*—Wendy R. Greening
*Attorney, Agent, or Firm*—Edward W. Goodman

[57] ABSTRACT

In a video camera having at least a semiconductor image sensor and a rotary sector shutter arranged in the radiation path of the semiconductor image sensor, in which the light-dependent charge integration in the semiconductor image sensor is released by applying a control signal, the sector shutter includes a plurality of light-transmissive sectors of different size. The charge integration of the semiconductor image sensor is released before a selected light-transmissive sector enters the radiation path thereby ensuring equal integration periods for all portions of the semiconductor image sensor.

5 Claims, 2 Drawing Sheets

VIDEO CAMERA COMPRISING AT LEAST A SEMICONDUCTOR IMAGE SENSOR AND A ROTATING SECTOR SHUTTER

BACKGROUND OF THE INVENTION

1. Field of the Invention

The invention relates to a video camera comprising at least a semiconductor image sensor and a rotary sector shutter arranged in a radiation path of the semiconductor image sensor, in which light-dependent charge integration in the semiconductor image sensor is released by applying a control signal thereto.

2. Description Of The Related Art

In video cameras comprising semiconductor image sensors of the charge transfer type, the light-sensitive surface is darkened by means of a rotating sector shutter during the transfer of the charges in a storage member of the image sensor so as to avoid a disturbance of the charge transfer. The rotating sector shutter is further used for reducing the exposure time so as to improve the sharpness when picking up fast moving objects.

In the conventional semiconductor image sensors, the next integration process after the charge transfer is released by means of a control signal. A charge integration in accordance with the incidence of light is thus only possible if this control signal is available and if the light is released by the sector shutter. In the known video cameras, this is utilized for setting exposure times of different lengths. To this end, the phase position of the sector shutter is controlled by means of a suitable control circuit in such a way that the sector shutter has already released the exposure when the integration process is started by means of the control signal.

The integration is ended by rotating the sector shutter. Since the side between a light-transmissive and an opaque sector of the shutter requires a finite time to get from the upper edge to the lower edge of the image, exposure at the lower edge of the image will take longer than exposure at the upper edge. This leads to an amplitude error of the video signal, also referred to as shading.

SUMMARY OF THE INVENTION

It is an object of the present invention to provide the possibility of different exposure times without the above-mentioned amplitude errors occurring in a video camera comprising at least a semiconductor image sensor and a rotating sector shutter.

This object is advantageously solved by the sector shutter comprising a plurality of light-transmissive sectors of different size, and in that the charge integration is released before a selected light-transmissive sector enters the path of radiation.

As compared with known video cameras, no additional components are required. Only a different shaping of the sector shutter and the associated control circuit is required.

The invention may be used in a video camera comprising a semiconductor image sensor for picking up monochrome as well as color images. The invention is further suitable for color video cameras comprising a plurality of semiconductor image sensors in which a beam splitter is arranged between the sector shutter and the semiconductor image sensors.

BRIEF DESCRIPTION OF THE DRAWINGS

These and other aspects of the invention will be apparent from and elucidated with reference to the embodiments described hereinafter. In the drawings

DESCRIPTION OF THE PREFERRED EMBODIMENT

Figure 1:
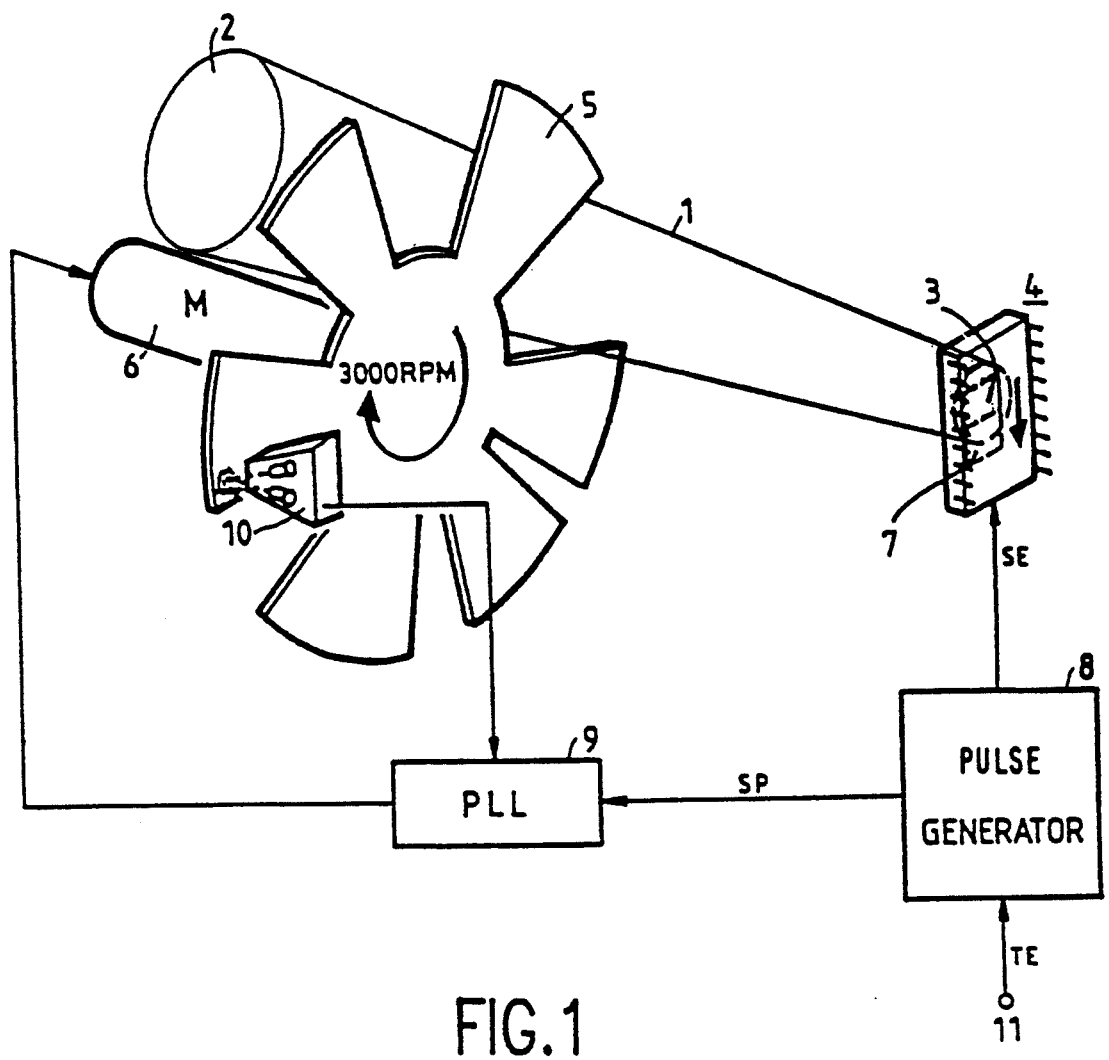
FIG. 1 shows, diagrammatically, an embodiment of the invention.

Identical components have the same reference numerals in the Figures. FIG. 1 only shows those parts of a video camera according to the invention which are required for understanding the invention.

A rotary sector shutter 5 is arranged in the radiation path 1 between an objective 2 and the light-sensitive surface 3 of a semiconductor image sensor 4. The sector shutter has light-transmissive sectors of different size. It is driven by a motor 6 at 3000 revolutions per minute, i.e. at 50 revolutions per second. Within a field period of 1/50 second, the light-sensitive surface 3 is thus successively exposed, using exposure times denoted by line E in FIG. 2. Dependent on specific requirements, these exposure times may be different. Moreover, an adaptation to television systems using a field frequency of 60 Hz is possible by realizing a correspondingly higher number of revolutions of the sector shutter 5.

The semiconductor image sensor 4 has not only a light-sensitive area 3 but also a storage area 7 in which the charges produced by exposure of the single pixels are transferred after the exposure has taken place. The video signals corresponding to the charges are read in known manner from the storage area 7, which is not shown in FIG. 1. For the sake of clarity, FIG. 1 shows only one control signal SE of the large number of signals required for operating the semiconductor image sensor 4. This control signal releases the charge integration in the light-sensitive area 3. This control signal releases the charge integration in the light-sensitive area 3. This signal is generated in a pulse generator 8 which further applies a synchronizing pulse SP to a PLL circuit 9 for synchronizing the sector shutter 5. In the PLL circuit 9, the output signal of a sensor 10 is compared with the synchronizing pulse SP with respect to the phase position and a setting value for the motor 6 is gained from this comparison. This results in a coupling of the phase position of the sector shutter 5 with the synchronizing pulse SP.

The pulse generator 8 comprises a device for adjusting the phase position between the control signal SE and the synchronizing pulse SP in dependence upon a value, supplied at 11 for the exposure time TE. With this value the time during which the charge integration is released can be shifted with respect to the single exposure times E in such a way that the desired exposure time falls within the duration of the pulse SE. In the example shown in FIG. 2 this is an exposure time of 1/800 s.

Figure 2:
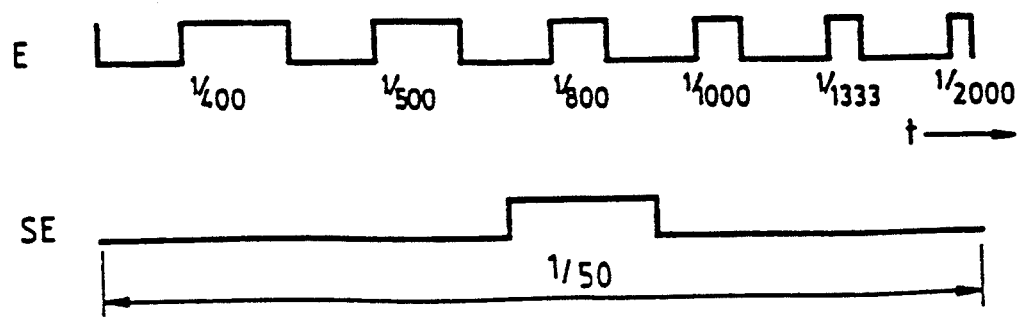
FIG. 2 shows time diagrams to explain the embodiment of FIG. 1.

For a better light efficiency the exposure time may also be increased by a time which is longer than the duration of one of the times shown in FIG. 2. To this end, the pulse SE is increased in such a way that it covers a plurality or possibly even all shutter-defined exposure times.

Figure 3:
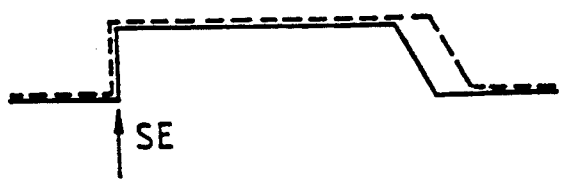
FIG. 3 is a representation with respect to time of a charge integration in a known video camera.
Figure 4:
FIG. 4 is a representation with respect to time of a charge integration in a video camera according to the invention.

The advantage of the video camera according to the invention with regard to shading will hereinafter be explained with reference to FIGS. 3 and 4. The exposure times and charge integration periods are shown in FIG. 3 for a known video camera, and in FIG. 4, for the video camera according to the invention. The broken line denotes the lower edge of the image and the solid line denotes the upper edge of the image.

In the known video camera, the radiation is already released when the leading edge of the control signal SE (shown by means of an arrow) occurs. Since this signal is simultaneously effective for all pixels, the charge integration starts at this instant both at the upper edge and at the lower edge in dependence upon the incident light. However, the rotary sector shutter darkens the upper edge at an earlier instant than the lower edge. Consequently, the effective exposure time, i.e. the charge integration period, is longer at the lower edge of the image than at the upper edge. A variation of the exposure time is possible by changing the phase position between the control signal SE and the sector shutter.

In the video camera according to the invention, the leading edge of the control signal SE occurs before the sector shutter first exposes the upper edge of the image and then the lower edge. The charge integration ends first for the upper edge and then for the lower edge. Although the integration periods re mutually offset with respect to time, they are equally long. The exposure time is only determined by the size of the light-transmissive sectors of different size is therefore provided, which sectors can be optionally activated by a suitable, step-wise phase shift.

Figure 5:
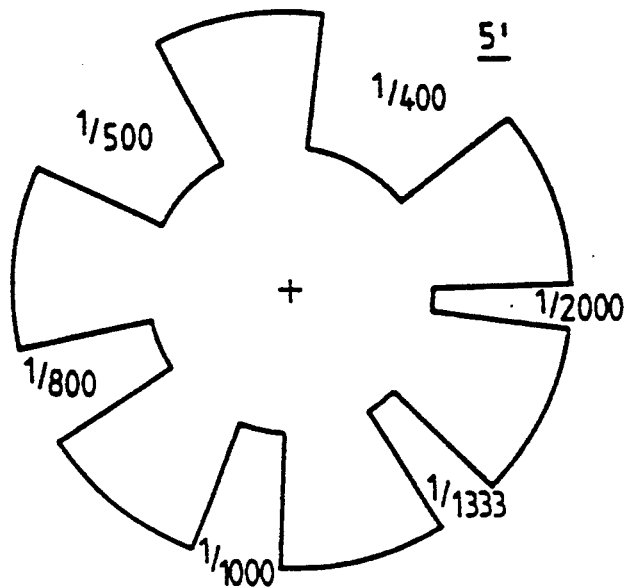
FIG. 5 shows an embodiment of a sector shutter in a video camera according to the invention.

FIG. 5 shows a sector shutter 5' comprising a six light-transmissive sectors which are arranged according to size and yield exposure times of 1/400, 1/500, 1/800, 1/1000, 1/1333 and 1/2000 second at 3000 revolutions per minute.

Figure 6:
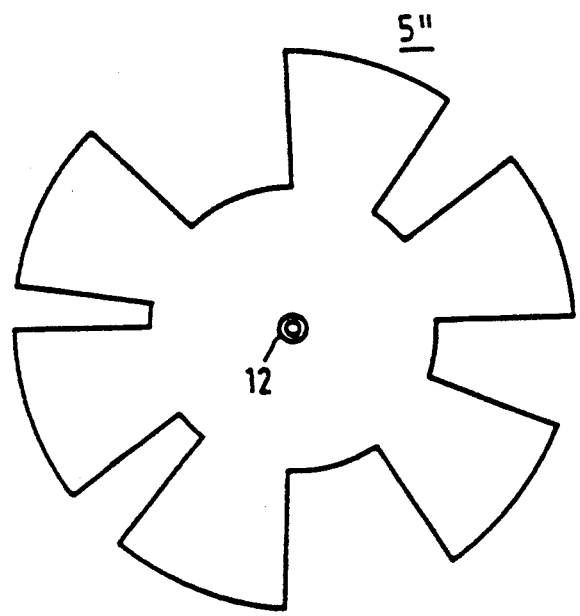
FIG. 6 shows a further embodiment of a sector shutter.

The sector shutter 5" in FIG. 6 has the same light-transmissive sectors as the sector shutter 5' in FIG. 5, but as regards their sequence and interspacing they are arranged in such a way that the center of gravity of the sector shutter 5" in FIG. 6 corresponds to the center of rotation 12. This precludes vibrations or the necessity of providing additional means for preventing unbalance.

I claim:

1. A video camera comprising a semiconductor image sensor and a rotary sector shutter arranged in a radiation path of the semiconductor image sensor, said video camera further comprising control means for generating a control signal for said semiconductor image sensor for enabling a light-dependent charge integration, and for controlling a rotational phase of said rotary sector shutter, characterized in that the rotary sector shutter comprises a plurality of light-transmissive sectors each of different size, and in that the control means enables the light-dependent charge integration in the semiconductor image sensor prior to causing a selected light-transmissive sector of said rotary sector shutter to enter the radiation path.

2. A video camera as claimed in claim 1, characterized in that said control means comprises a control circuit for generating the control signal, and a device, coupled to said control circuit, for driving said rotary sector shutter to a plurality of selectable phase positions with respect to the control signal.

3. A video camera as claimed in claim 1, characterized in that the light transmissive sectors are arranged on the rotary sector shutter as regards their size and interspacing in such a manner that a center of gravity of the rotary sector shutter corresponds to a center of rotation thereby obviating further balancing.

4. A video camera as claimed in claim 3, characterized in that the rotary sector shutter comprises six light-transmissive sectors.

5. A video camera as claimed in claim 1, characterized in that the charge integration is realized during exposure by said control means causing said rotary sector shutter to rotate to one or more of said plurality of light-transmissive sectors.

* * * * *